United States Patent
Watanabe et al.

(10) Patent No.: US 12,099,914 B2
(45) Date of Patent: Sep. 24, 2024

(54) ANALYSIS DEVICE, METHOD, AND PROGRAM FOR ANALYZING NEURAL NETWORK STRUCTURE

(71) Applicant: NIPPON TELEGRAPH AND TELEPHONE CORPORATION, Tokyo (JP)

(72) Inventors: Chihiro Watanabe, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 918 days.

(21) Appl. No.: 17/051,734

(22) PCT Filed: Apr. 23, 2019

(86) PCT No.: PCT/JP2019/017220
§ 371 (c)(1),
(2) Date: Oct. 29, 2020

(87) PCT Pub. No.: WO2019/212013
PCT Pub. Date: Nov. 7, 2019

(65) Prior Publication Data
US 2021/0241069 A1   Aug. 5, 2021

(30) Foreign Application Priority Data

May 1, 2018 (JP) ................................. 2018-088177

(51) Int. Cl.
*G06N 3/04* (2023.01)
*G06F 18/21* (2023.01)

(52) U.S. Cl.
CPC ............... *G06N 3/04* (2013.01); *G06F 18/21* (2023.01)

(58) Field of Classification Search
CPC ............ G06N 3/04; G06N 3/08; G06F 18/21
See application file for complete search history.

(56) References Cited

U.S. PATENT DOCUMENTS

| | | | | |
|---|---|---|---|---|
| 2013/0254138 | A1* | 9/2013 | Kudritskiy | G06N 3/04 706/26 |
| 2018/0095632 | A1* | 4/2018 | Leeman-Munk | G06F 3/04812 |
| 2019/0311210 | A1* | 10/2019 | Chatterjee | G06N 3/045 |

OTHER PUBLICATIONS

Watanabe et al. (2018) "Understanding Community Structure in Layered Neural Networks," arXiv.org > stat > arXiv:1804.04778 pp. 1-44.

* cited by examiner

*Primary Examiner* — Tan H Tran

(57) ABSTRACT

It is possible to analyze what type of input/output mapping is mainly performed in the entire hidden layer of a neural network. A relationship analysis unit 30 calculates strength of a relationship of each combination of a dimension of the input data and a unit of the neural network and calculates strength of a relationship of each combination of the unit and a dimension of the output data. A role analysis unit 32 calculates a relationship between a prescribed number of types of roles and the unit and a relationship between the prescribed number of types of roles, the dimension of the input data, and the dimension of the output data on the basis of the strength of the relationship of each combination of the dimension of the input data and the unit of the neural network and the strength of the relationship of each combination of the unit and the dimension of the output data.

17 Claims, 4 Drawing Sheets

ANALYSIS DEVICE, METHOD, AND PROGRAM FOR ANALYZING NEURAL NETWORK STRUCTURE

CROSS-REFERENCE TO RELATED APPLICATIONS

This application is a U.S. 371 Applications of International Patent Application No. PCT/JP2019/017220, filed on 23 Apr. 2019, which application claims priority to and the benefit of JP Application No. 2018-088177, filed on 1 May 2018, the disclosures of which are hereby incorporated herein by reference in their entireties.

TECHNICAL FIELD

The present invention relates to an analysis device, a method, and a program and, in particular, to an analysis device, a method, and a program for analyzing the structure of a neural network.

BACKGROUND ART

There has been a technology that applies a network analysis to a multilayer neural network learned from data to make it possible to extract a cluster structure and quantitatively determine the role of each extracted cluster from a relationship with each dimension of input/output data (Non-Patent Literature 1).

CITATION LIST

Non Patent Literature

[NPL 1] Watanabe. C, Hiramatsu. K, and Kashino. K. "Understanding Community Structure in Layered Neural Networks". ArXiv. 2018

SUMMARY OF THE INVENTION

Technical Problem

The above existing technology makes it possible to read the role of each community in a community structure extracted from a multilayer neural network. However, since the clustering of units is performed for each layer of the neural network in the technology, it is not possible to grasp the similarity of the role of each unit between layers. In order to grasp not only the role assumed by a part of the neural network but also the fact as to what type of input/output mapping is mainly performed in the entire hidden layer of the neural network, a new technology is required.

The present invention has been made in view of the above circumstances and has an object of providing an analysis device, a method, and a program making it possible to analyze what type of input/output mapping is mainly performed in the entire hidden layer of a neural network.

Means for Solving the Problem

In order to achieve the above object, an analysis device according to the present invention includes: an input unit that receives a previously-learned neural network for outputting output data from input data on the basis of learning data including the input data and the output data; a relationship analysis unit that calculates strength of a relationship of each combination of a dimension of the input data and a unit of the neural network and calculates strength of a relationship of each combination of the unit and a dimension of the output data; and a role analysis unit that calculates a relationship between a prescribed number of types of roles and the unit and a relationship between the prescribed number of types of roles, the dimension of the input data, and the dimension of the output data on the basis of the strength of the relationship of each combination of the dimension of the input data and the unit of the neural network and the strength of the relationship of each combination of the unit and the dimension of the output data.

Further, an analysis method according to the present invention includes: receiving a previously-learned neural network for outputting output data from input data on the basis of learning data including the input data and the output data by an input unit; calculating strength of a relationship of each combination of a dimension of the input data and a unit of the neural network and calculating strength of a relationship of each combination of the unit and a dimension of the output data by a relationship analysis unit; and calculating a relationship between a prescribed number of types of roles and the unit and a relationship between the prescribed number of types of roles, the dimension of the input data, and the dimension of the output data on the basis of the strength of the relationship of each combination of the dimension of the input data and the unit of the neural network and the strength of the relationship of each combination of the unit and the dimension of the output data by a role analysis unit.

A program according to the present invention is a program for causing a computer to function as each unit of the above analysis device according to the present invention.

Effects of the Invention

According to the analysis device, the method, and the program of the present invention, a relationship between a prescribed number of types of roles and a unit and a relationship between the prescribed number of types of roles and a dimension of input data and a dimension of output data are calculated on the basis of the strength of the relationship of each combination of the dimension of the input data and the unit of a neural network and the strength of the relationship of each combination of the unit and the dimension of the output data. As a result, the effect of making it possible to analyze what type of input/output mapping is mainly performed in the entire hidden layer of the neural network is obtained.

DESCRIPTION OF EMBODIMENTS

Hereinafter, an embodiment of the present invention will be described in detail with reference to the drawings.

<Configuration of Analysis Device According to Embodiment of Present Invention>

Figure 1:
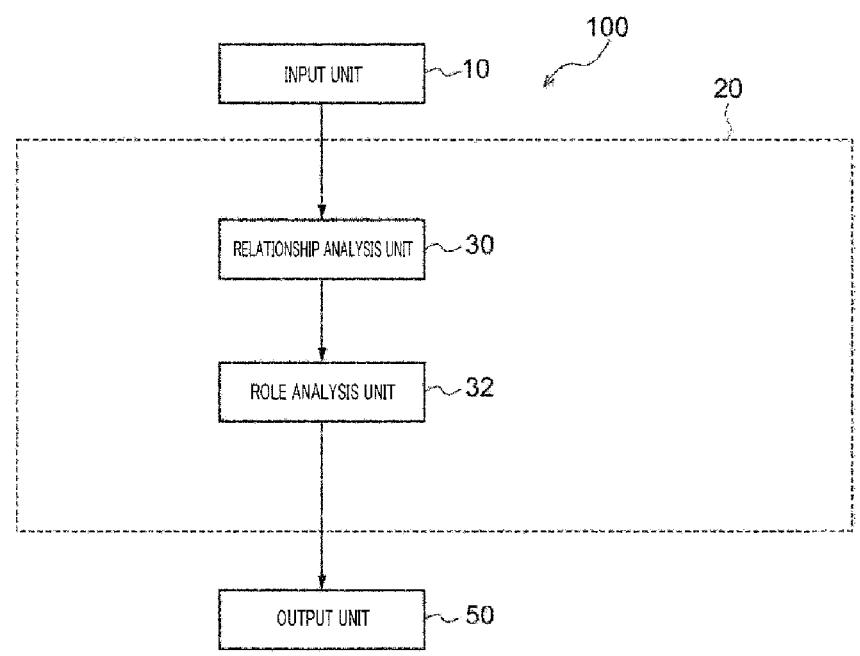
FIG. 1 is a block diagram showing the configuration of an analysis device according to an embodiment of the present invention.

Next, the configuration of an analysis device according to the embodiment of the present invention will be described. As shown in FIG. 1, an analysis device 100 according to the embodiment of the present invention can be constituted by a computer including a CPU, a RAM, and a ROM storing a program or various data for performing an analysis processing routine that will be described later. Functionally, the analysis device 100 includes an input unit 10, a computation unit 20, and an output unit 50 as shown in FIG. 1.

The input unit 10 receives a previously-learned neural network. Further, the input unit 10 receives learning data including the input data of the neural network and output data with respect to the input data. The neural network is learned as a neural network for outputting output data from input data on the basis of learning data including the input data and the output data.

The computation unit 20 is constituted by a relationship analysis unit 30 and a role analysis unit 32.

On the basis of the information input to the input unit 10, the relationship analysis unit 30 calculates the strength $v_{ki}^{in}$ of the relationship of each combination of a dimension i of the input data and a unit k in the hidden layer of the neural network, and calculates the strength $v_{kj}^{out}$ of the relationship of each combination of the unit k in the hidden layer and a dimension j of the output data.

Specifically, the relationship analysis unit 30 inputs the learning data to the neural network, and defines and calculates, for each combination of the dimension i of the input data and the unit k, the square error between the output of the unit k obtained by replacing the value of the dimension i of the input data representing the learning data with the average value of the dimension i of the input data included in the learning data and the output of the unit k with respect to the input data before the replacement as the strength $v_{ki}^{in}$ of the relationship of the combination of the dimension i of the input data and the unit k.

Further, the relationship analysis unit 30 inputs the learning data to the neural network, and defines and calculates, for each combination of the unit k and the dimension j of the output data, the square error between the value of the dimension j of the output data obtained by replacing the output value of the unit k with the average output value of the unit k when the input data included in the learning data is input and the value of the dimension j of the output data before the replacement as the strength $v_{kj}^{out}$ of the relationship of the combination of the unit k and the dimension j of the output data.

By the above computation, the strength of the relationship with the input/output dimension of each unit k is obtained by the vector forms $(v^{in}=\{v_{k,i}^{in}\}, v^{out}=\{v_{k,j}^{out}\})$, each of which is a feature vector expressing the role of each unit k.

Figure 2:
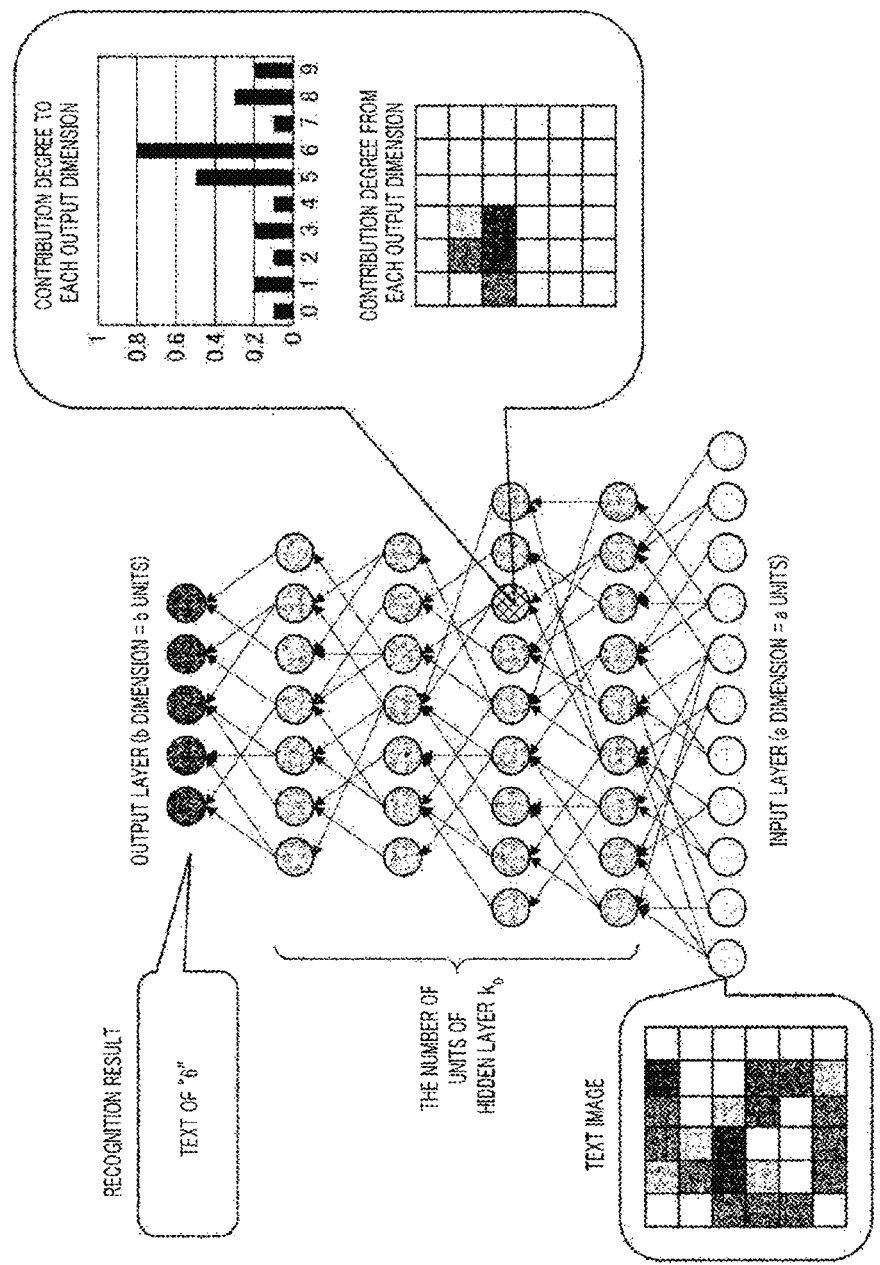
FIG. 2 is a diagram showing an example of a case in which a contribution degree to an input and an output in a unit of a hidden layer is expressed.

For example, when a neural network that performs text image recognition (outputs a result predicting what text is written in an image with the image as an input) is input, a vector expressing which part of the input image is seen and what text is recognized by each unit of a hidden layer in the neural network is calculated (see FIG. 2).

The role analysis unit 32 calculates the relationship between a prescribed number of types of roles and the unit and the relationship between the prescribed number of types of roles, the dimension of the input data, and the dimension of the output data on the basis of the strength of the relationship of each combination of the dimension of the input data and the unit in the hidden layer of the neural network and the strength of the relationship of each combination of the unit in the hidden layer and the dimension of the output data.

Specifically, the role analysis unit 32 applies, for each unit, nonnegative matrix factorization to a matrix expressing the strength of a relationship with each dimension of the input data and the strength of a relationship with each dimension of the output data to calculate a matrix expressing the relationship between the prescribed number of types of roles and the unit and a matrix expressing the relationship between the prescribed number of types of roles, the dimension of the input data, and the dimension of the output data.

For example, using the vectors $v^{in}$ and $v^{out}$ expressing the strength of the relationship with the input/output dimension of each unit k calculated by the relationship analysis unit 30, the main role of the entire hidden layer (what type of input information is associated with what type of output information) is calculated as will be described below.

First, a vector expressing the strength of the relationship with the input/output dimension of each unit is expressed as a matrix V.

$V=\{v_{k,l}\}$, $v_{b,l}=v_{k,l}^{in}$, for $l=1, \ldots, a_v$ $v_{k,l}=v_{b,l-a}^{out}$, for $l=a+1, \ldots, a+b$.

However, the vectors $v^{in}$ and $v^{out}$ expressing the strength of the relationship with the input/output dimension of each unit k are not used as they are, but processing such as coupling the vectors $v^{in}$ and $v^{out}$ together as the matrix V after normalizing the vectors so that the maximum value and the minimum value of elements in the two vectors coincide with each other may be performed.

Here, a represents the dimension of the input data, and b represents the dimension of the output data. When the number of units of the hidden layer is represented as $k_0$, V becomes the matrix of $k_0 \times (a+b)$ (in which the row direction corresponds to each unit of the hidden layer and the column direction corresponds to each input/output dimension).

By the application of nonnegative matrix factorization to the above matrix V, two matrices W and H expressed by the following formula are obtained.

$V \approx WH$ [Formula 1]

Here, W represents the matrix of $k_0 \times c$, and H represents the matrix of $c \times (a+b)$. When it is assumed that the role of the unit of the entire hidden layer can be classified into c types, the roles of the c types (that are expressed by the matrix H) and the association degree between each unit in the hidden layer and the roles of the c types (that is expressed by the matrix W) are calculated. Each row of the matrix H expresses the roles classified into the c types from the viewpoint of the "strength of a relationship with each input/output dimension". Each row of the matrix W expresses the role of each unit of the hidden layer from the viewpoint of "which of and to what degree the roles classified into the c types are assumed" (see FIG. 3). Note that the value (positive integer) of c is set in advance.

Further, the specific algorithm of the nonnegative matrix factorization is shown below.

Algorithm 1 Algorithm of Nonnegative Matrix Factorization

1: The number of replications of the algorithm is represented as $a_0$, and the matrix expressing the role of each unit of the hidden layer is represented as V.

-continued

Algorithm 1 Algorithm of Nonnegative Matrix Factorization

Figure 3:
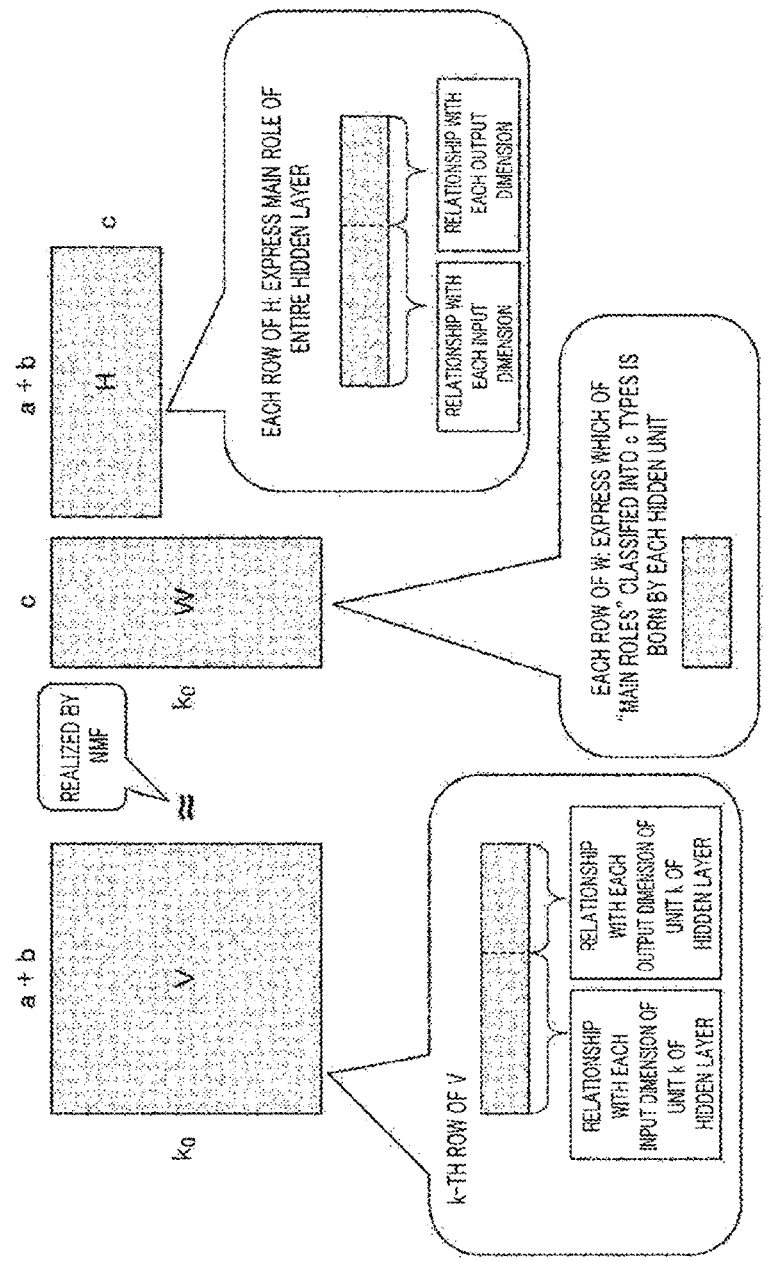
FIG. 3 is a diagram showing an example of a result obtained when nonnegative matrix factorization is applied to a matrix expressing the strength of a relationship with each dimension of input data and the strength of a relationship with each dimension of output data for each unit.

2:   The initialization of the matrices T and U may be performed as, for example, follows:

$t_{k,c} \overset{i.i.d.}{\sim} N(\mu_1, \sigma_1), u_{c,l} \overset{i.i.d.}{\sim} N(\mu_2, \sigma_2)$. For example, $\mu_1 = \sigma_1 = \mu_2 = \sigma_2 = 0.5$ or the like may be set 3:   for $a = 1$ to $a_0$ do
4:       $t_{k,c} \leftarrow t_{k,c} \times ((VU^T)_{k,c}/(TUU^T)_{k,c})$.
5:       $t_{k,c} \leftarrow \max(t_{k,c}, 0)$.
6:       $u_{c,l} \leftarrow u_{c,l} \times ((T^TV)_{c,l}/(T^TTU)_{c,l})$.
7:       $u_{c,l} \leftarrow \max(u_{c,l}, 0)$.
8:   end for In order to facilitate the interpretation of an analysis result by the relationship analysis unit 30, the output unit 50 outputs the strength $v_{ki}^{in}$ of the relationship of the combination of the dimension i of the input data and the unit k and the strength $v_{kj}^{out}$ of the relationship of the combination of the unit k and the dimension j of the output data so as to be expressed by a vector or a matrix. For example, a case in which the present embodiment is applied to a neural network that performs text image recognition (outputs a result predicting what text is written in an image with the image as an input) to recognize a text image using the learning data of the text image will be described. In this example, with respect to the unit of the neural network as shown in FIG. 3, it is possible to express a contribution degree as to what text is recognized by the unit in such a manner that the strength of a relationship with each output dimension of the unit is expressed as a contribution degree by a bar graph, or it is possible to express the strength of a relationship as a contribution degree as to which part of the information of an input image is received by the unit in such a manner that a contribution degree to the unit from each input dimension is expressed by the distribution of a matrix.

Further, the output unit 50 outputs each row of the matrix W representing an analysis result by the role analysis unit 32 as one expressing which of the "main roles" classified into the c types is assumed by each unit of the hidden layer. Thus, for example, it is possible to grasp the fact that the role of "distinguishing 4 and 9 from the information of pixels at the upper part of an image" and the role of "distinguishing 0 from the information of pixels at the central part of the image" are assumed by a certain unit of the hidden layer at a rate of about 50%, or the like.

Further, the output unit 50 outputs each row of the matrix H representing an analysis result by the role analysis unit 32 as one expressing the main role of the entire hidden layer. Thus, for example, it is possible to grasp the main role such as "distinguishing 4 and 9 from the information of pixels at the upper part of the image".

<Operation of Analysis Device According to Embodiment of Present Invention>

Figure 4:
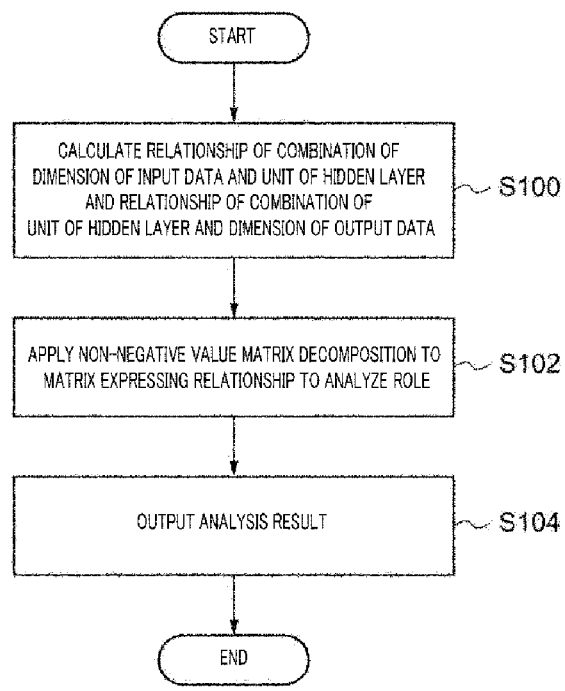
FIG. 4 is a flowchart showing an analysis processing routine in the analysis device according to the embodiment of the present invention.

Next, the operation of the analysis device 100 according to the embodiment of the present invention will be described. Upon receiving a previously-learned neural network and learning data including input data and output data by the input unit 10, the analysis device 100 performs an analysis processing routine shown in FIG. 4.

In step S100, the relationship analysis unit 30 inputs the learning data to the neural network, and defines and calculates, for each combination of a dimension i of the input data representing the learning data and a unit k in a hidden layer, the square error between the output of the unit k obtained by replacing the value of the dimension i of the input data with the average value of the dimension i of the input data included in the learning data and the output of the unit k with respect to the input data before the replacement as the strength $v_{ki}^{in}$ of the relationship of the combination of the dimension i of the input data and the unit k. Further, the relationship analysis unit 30 inputs the learning data to the neural network, and defines and calculates, for each combination of the unit k in the hidden layer and a dimension j of the output data, the square error between the value of the dimension j of the output data obtained by replacing the output value of the unit k with the average output value of the unit k when the input data included in the learning data is input and the value of the dimension j of the output data before the replacement as the strength $v_{kj}^{out}$ of the relationship of the combination of the unit k and the dimension j of the output data.

In step S102, the role analysis unit 32 applies, for each unit, nonnegative matrix factorization to a matrix V expressing the strength of a relationship with each dimension of the input data and the strength of a relationship with each dimension of the output data to calculate a matrix W expressing the relationship between a prescribed number of types of roles and the unit and a matrix H expressing the relationship between the prescribed number of types of roles, the dimension of the input data, and the dimension of the output data.

In step S104, the output unit 50 outputs the strength $v_{ki}^{in}$ of the relationship of the combination of the dimension i of the input data and the unit k and the strength $v_{kj}^{out}$ of the relationship of the combination of the unit k and the dimension j of the output data so as to be expressed by a vector or a matrix.

Further, the output unit 50 outputs each row of the matrix W representing an analysis result by the role analysis unit 32 as one expressing which of "main roles" classified into c types is assumed by each hidden unit. Further, the output unit 50 outputs each row of the matrix H representing an analysis result by the role analysis unit 32 as one expressing the main role of the entire hidden layer.

As described above, by calculating the relationship between a prescribed number of types of roles and a unit and the relationship between the prescribed number of types of roles and the dimension of input data and the dimension of output data on the basis of the strength of the relationship of each combination of the dimension of the input data and the unit of a neural network and the strength of the relationship of each combination of the unit and the dimension of the output data, it is possible to analyze what type of input/output mapping is mainly performed in the entire hidden layer of the neural network according to the analysis device of the embodiment of the present invention.

Further, by presenting the main role of the entire unit of a hidden layer from the viewpoint of "which dimension of the information of input data is used and which dimension of the information of an output is deduced" using the technology of the embodiment of the present invention, it is possible to roughly know the function of mapping from an input to an output in a neural network learned from data. For example, when the present technology is applied to a neural network that performs text image recognition as shown in FIG. 2, it is possible to know the fact as to which part of an input image is seen and what text is recognized by the neural network in a hidden layer in such a manner as to be classified into main roles.

Further, by analyzing a relationship with the input/output of each unit with respect to a neural network learned from data and applying nonnegative matrix factorization to a matrix defined by the analysis, it is possible to acquire knowledge about a deduction mechanism in the entire hidden layer of the neural network.

Note that the present invention is not limited to the embodiment described above but various modifications or applications are made possible without departing from the spirit of the present invention.

REFERENCE SIGNS LIST 10 input unit
20 computation unit
30 relationship analysis unit
32 role analysis unit
50 output unit
100 analysis device

The invention claimed is:

1. A computer-implemented method for analyzing aspects of a neural network, the method comprising:
receiving the neural network, wherein the neural network is previously learnt, and wherein the neural network includes input data, a plurality of units, and output data;
determining a first strength of a first relationship between a first dimension of the input data and a unit of the plurality of units of the neural network;
determining a second strength of a second relationship between the unit and a second dimension of the output data of the neural network;
determining, based on the first strength of the first relationship and the second strength of the second relationship, at least one of:
a third relationship between a prescribed number of types of roles and the unit,
a fourth relationship between the prescribed number of types of roles and the first dimension of the input data, and
a fifth relationship between the prescribed number of types of roles and the second dimension of the output data; and
providing, based at least in part on the determined third relationship, the determined fourth relationship, and the determined fifth relationship, interactive output,
wherein the first strength of the first relationship relates to a first square error between a third dimension of a first output of the unit and a fourth dimension of a second output of the unit,
wherein the second output of the output relates to replacing a value of the first dimension of the input data with an average value of dimensions of input data of learning data; and
wherein the second strength of second relationship relates to a second square error between the third dimension of the first output of the unit and the fourth dimension of the second output of the unit, and therein an average value of dimensions of the output data using input data of the learning data replaces the third dimension of the first output of the unit.

2. The computer-implemented method of claim 1, the method further comprising:
generating a first matrix, wherein the first matrix includes one or more of:
the first strength of the first relationship between the first dimension of the input data and the unit of the plurality of units of the neural network, and
the second strength of the second relationship between the unit and a second dimension of the output data of the neural network;
performing a non-negative matrix factorization to the first matrix; and
generating, based on the performed non-negative matrix factorization to the first matrix, one or more of:
a second matrix, wherein the second matrix includes the third relationship between the prescribed number of types of roles and the unit,
a third matrix, wherein the third matrix includes the fourth relationship between the prescribed number of types of roles and the first dimension of the input data, and
a fourth matrix, wherein the fourth matrix includes the fifth relationship between the second dimension of the output data.

3. The computer-implemented method of claim 1, wherein the plurality of units includes units in one or more hidden layers of the neural network.

4. The computer-implemented method of claim 1, wherein each strength of a relationship represents one of:
a first contribution by the first dimension of the input data to the unit, and
a second contribution by the unit to the second dimension of the output data.

5. The computer-implemented method of claim 1, the method further comprising:
receiving the unit of the plurality of units of the neural network; and
providing the interactive output, wherein the interactive output relates to the received unit.

6. The computer-implemented method of claim 1,
wherein the neural network is trained for performing a text image recognition,
wherein the input data includes image data of a text,
wherein the output data includes a text representation of the image data of the text, and
wherein the first strength of the first relationship between the first dimension of the input data and the unit indicates which part of the image data is seen and what text is recognized by the unit in a hidden layer of the neural network.

7. A system for analyzing aspects of a neural network, the system comprises:
a processor; and
a memory storing computer-executable instructions that when executed by the processor cause the system to:
receive the neural network, wherein the neural network is previously learnt, and wherein the neural network includes input data, a plurality of units, and output data;
determine a first strength of a first relationship between a first dimension of the input data and a unit of the plurality of units of the neural network;
determine a second strength of a second relationship between the unit and a second dimension of the output data of the neural network;
determine, based on the first strength of the first relationship and the second strength of the second relationship, at least one of:
a third relationship between a prescribed number of types of roles and the unit,
a fourth relationship between the prescribed number of types of roles and the first dimension of the input data, and a fifth relationship between the prescribed number of types of roles and the second dimension of the output data; and provide, based at least in part on the determined third relationship, the determined fourth relationship, and the determined fifth relationship, interactive output, wherein the first strength of the first relationship relates to a first square error between a third dimension of a first output of the unit and a fourth dimension of a second output of the unit, wherein the second output of the output relates to replacing a value of the first dimension of the input data with an average value of dimensions of input data of learning data, and wherein the second strength of second relationship relates to a second square error between the third dimension of the first output of the unit and the fourth dimension of the second output of the unit, and therein an average value of dimensions of the output data using input data of the learning data replaces the third dimension of the first output of the unit.

8. The system of claim 7, the computer-executable instructions when executed further causing the system to:
generate a first matrix, wherein the first matrix includes one or more of:
the first strength of the first relationship between the first dimension of the input data and the unit of the plurality of units of the neural network, and
the second strength of the second relationship between the unit and a second dimension of the output data of the neural network;
perform a non-negative matrix factorization to the first matrix; and
generate, based on the performed non-negative matrix factorization to the first matrix, one or more of:
a second matrix, wherein the second matrix includes the third relationship between the prescribed number of types of roles and the unit,
a third matrix, wherein the third matrix includes the fourth relationship between the prescribed number of types of roles and the first dimension of the input data, and
a fourth matrix, wherein the fourth matrix includes the fifth relationship between the second dimension of the output data.

9. The system of claim 7, wherein the plurality of units includes units in one or more hidden layers of the neural network.

10. The system of claim 7, wherein each strength of a relationship represents one of:
a first contribution by the first dimension of the input data to the unit, and
a second contribution by the unit to the second dimension of the output data.

11. The system of claim 7, the computer-executable instructions when executed further causing the system to:
receive the unit of the plurality of units of the neural network; and
provide the interactive output, wherein the interactive output relates to the received unit.

12. The system of claim 7, wherein the neural network is trained for performing a text image recognition,
wherein the input data includes image data of a text,
wherein the output data includes a text representation of the image data of the text, and
wherein the first strength of the first relationship between the first dimension of the input data and the unit indicates which part of the image data is seen and what text is recognized by the unit in a hidden layer of the neural network.

13. A computer-readable non-transitory recording medium storing computer-executable instructions that when executed by a processor cause a computer system to:
receive the neural network, wherein the neural network is previously learnt, and wherein the neural network includes input data, a plurality of units, and output data;
determine a first strength of a first relationship between a first dimension of the input data and a unit of the plurality of units of the neural network; and
determine a second strength of a second relationship between the unit and a second dimension of the output data of the neural network;
determine, based on the first strength of the first relationship and the second strength of the second relationship, at least one of:
a third relationship between a prescribed number of types of roles and the unit,
a fourth relationship between the prescribed number of types of roles and the first dimension of the input data, and
a fifth relationship between the prescribed number of types of roles and the second dimension of the output data; and
provide, based at least in part on the determined third relationship, the determined fourth relationship, and the determined fifth relationship, interactive output,
wherein the first strength of the first relationship relates to a first square error between a third dimension of a first output of the unit and a fourth dimension of a second output of the unit,
wherein the second output of the output relates to replacing a value of the first dimension of the input data with an average value of dimensions of input data of learning data, and
wherein the second strength of second relationship relates to a second square error between the third dimension of the first output of the unit and the fourth dimension of the second output of the unit, and therein an average value of dimensions of the output data using input data of the learning data replaces the third dimension of the first output of the unit.

14. The computer-readable non-transitory recording medium of claim 13, the computer-executable instructions when executed further causing the system to:
generate a first matrix, wherein the first matrix includes one or more of:
the first strength of the first relationship between the first dimension of the input data and the unit of the plurality of units of the neural network, and
the second strength of the second relationship between the unit and a second dimension of the output data of the neural network;
perform a non-negative matrix factorization to the first matrix; and
generate, based on the performed non-negative matrix factorization to the first matrix, one or more of:
a second matrix, wherein the second matrix includes the third relationship between the prescribed number of types of roles and the unit,
a third matrix, wherein the third matrix includes the fourth relationship between the prescribed number of types of roles and the first dimension of the input data, and a fourth matrix, wherein the fourth matrix includes the fifth relationship between the second dimension of the output data.

15. The computer-readable non-transitory recording medium of claim 13, wherein the plurality of units includes units in one or more hidden layers of the neural network, and wherein each strength of a relationship represents one of:
a first contribution by the first dimension of the input data to the unit, and
a second contribution by the unit to the second dimension of the output dat.

16. The computer-readable non-transitory recording medium of claim 13, the computer-executable instructions when executed further causing the system to:
receive the unit of the plurality of units of the neural network;
provide the interactive output, wherein the interactive output relates to the received unit.

17. The computer-readable non-transitory recording medium of claim 13, wherein the neural network is trained for performing a text image recognition,
wherein the input data includes image data of a text,
wherein the output data includes a text representation of the image data of the text, and
wherein the first strength of the first relationship between the first dimension of the input data and the unit indicates which part of the image data is seen and what text is recognized by the unit in a hidden layer of the neural network.

* * * * *